C. A. BISHOP.
CALCULATING RECORD CARD.
APPLICATION FILED JULY 23, 1913.

1,263,365.

Patented Apr. 23, 1918.
2 SHEETS—SHEET 1.

C. A. BISHOP.
CALCULATING RECORD CARD.
APPLICATION FILED JULY 23, 1913.
1,263,365.
Patented Apr. 23, 1918.
2 SHEETS—SHEET 2.
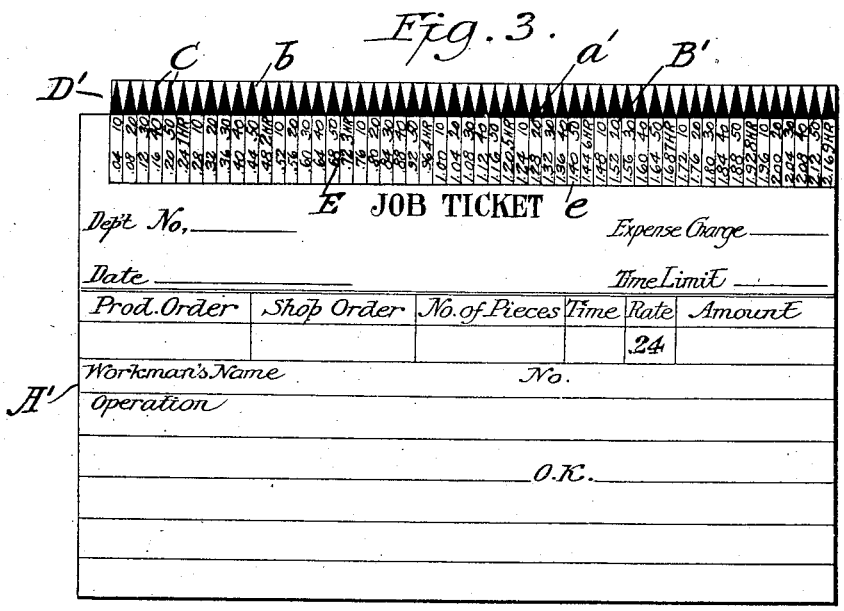
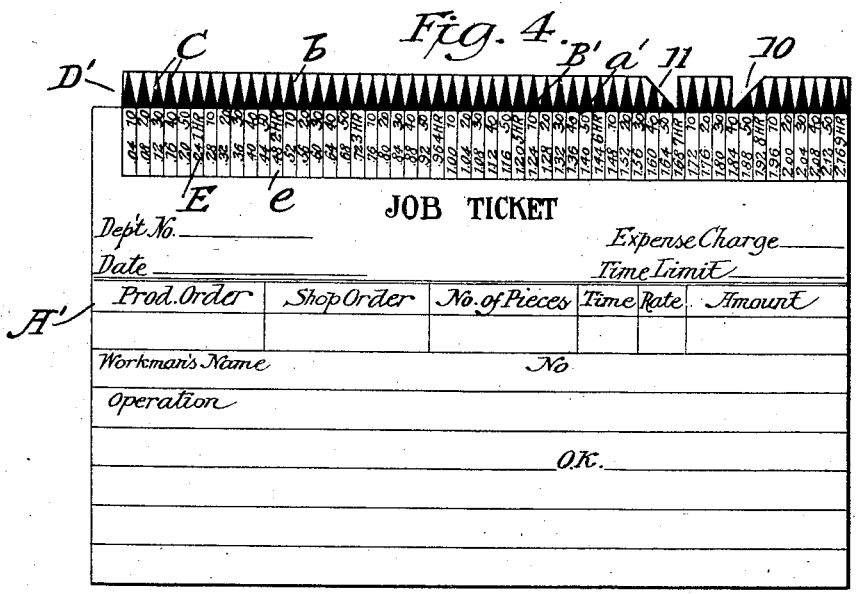
Witnesses:
A. R. Appleman
Joseph Harth
Inventor
CLARENCE A. BISHOP.
By his Attorneys,
Griffin Bernhard

UNITED STATES PATENT OFFICE.

CLARENCE A. BISHOP, OF BROOKLYN, NEW YORK.

CALCULATING RECORD-CARD.

1,263,365. Specification of Letters Patent. Patented Apr. 23, 1918.

Original application filed June 9, 1910, Serial No. 565,959. Patent No. 1,065,501. Divided and this application filed July 23, 1913. Serial No. 780,637.

*To all whom it may concern:*

Be it known that I, CLARENCE A. BISHOP, a citizen of the United States, residing in the city of New York, borough of Brooklyn, county of Kings, and State of New York, have invented a certain new and useful Calculating Record-Card, of which the following is a specification.

This invention is a record card for use by workmen to designate thereon the amount of time devoted to one or more jobs of work, the record thus produced being utilized in computing the cost of work and the value of the wages to be paid therefor.

An essential feature of the invention is a card provided with a scale denoting the working hours of a day, or other unit of time, and with means corresponding to said scale for accurately marking the card to designate thereon the time between starting and stopping work on a job.

The invention is susceptible of embodiment in different forms, in one of which the card with the time scale is used by the workman to indicate thereon the time devoted to one or more jobs, and is thereafter delivered to the auditor or other official for use in connection with wage tables on a chart, or other instrument, for computing the value of the wages to be paid for the service rendered and the cost of the work. When the card is to be used in this manner, the workman marks it with a pencil, or other instrument, to designate the minute and hour of starting one or more jobs, the marking index provided on the card being useful for the accurate designation of such time intervals. To facilitate the calculations on the part of the auditor, it is preferred to provide the card with means for accurately positioning it with respect to a wage scale on a chart, said means consisting in one form of the invention in a row of apertures positioned next to the column representing the time scale, so that the bookkeeper or other employee may, by the aid of the wage scale, calculate the wage and cost value in an easy, accurate and rapid manner.

In another form the card, provided with the time scale and the indicating means, is adapted for use in a recording apparatus, one form of which recording apparatus is disclosed in a pending application Serial No. 775,014, filed June 21, 1913. Substantially the same form of recording apparatus is disclosed in my U. S. Patent No. 1,065,501 granted June 24, 1913 as an exemplification of means suitable for carrying out the patented method of calculating and making unalterable records, said patent disclosing, also, a card provided with a time scale, with or without a rate scale and said card having a permanent index in the form of a notch for accurately positioning the card with respect to a device by which the relation of the card to a marking or punching device is determined. So far as concerns the card of the aforesaid method patent, this application is a division of my prior application of June 9, 1910 which eventuated in said Patent 1,065,501.

Accordingly, the invention pertaining to the card may be embodied in two forms, in one of which the workman marks said card by hand with the aid of a pencil, or otherwise, and in another of which forms of card it is punched or otherwise marked by the recording apparatus.

It may be stated that cards for individual jobs of work may be used, particularly if it is desired to use said cards in the recording apparatus. Furthermore, the cards may be provided with wage scales, based upon the time multiplied by the rate per hour, as set forth in said patent; but as this requires a number of different forms of cards to be printed with the wage scales paid to different grades of workmen, and as it may not be desired to publish the rates of wages paid to the different men, it is evident that the wage scale may or may not be employed. When such wage scale is omitted from the card, a standard or uniform card may be used for all the workmen, and the calculations necessary to ascertain costs and wages made in the auditor's office accurately and rapidly from the data afforded by the cards and by using the same in connection with wage scales on a chart, as will be hereinafter described.

Other features of the invention and the advantages thereof will appear from the following description.

In the drawings,

Figure 1 is a plan view of a calculating record card embodying the invention.

Fig. 2 is a portion of the card showing it marked by the workman to indicate different jobs thereon.

Fig. 3 is a plan of another form of card adapted for use in a recording machine.

Fig. 4 is a view of the card when punched at successive operations of the machine and at different periods of time to show thereon the elapsed time and the value of the wages or the cost of the job.

The card A of Figs. 1 and 2 is a substantially rectangular piece of suitable material, such as card board, provided with columns $a$, $b$, near one margin and a row of apertures $c$. In the column $a$ are figures denoting the hours of a working day and suitable divisions of each hour, said column and figures producing a time scale B. The apertures $c$ are quite small, each being sufficiently large for the insertion of a pencil point, stylus, or other implement so that the card is adapted for use in the auditor's office in effecting the calculations to ascertain costs, etc. The row of apertures $c$ is parallel and adjacent to one column, preferably the column ($a$) containing the time scale, and these apertures are spaced at intervals corresponding to the divisions in the time scale.

The column $b$ of the card contains a series of indications C by which the card may be marked accurately by hand or in a like manner by the recording apparatus. Each indicator in the series is a tapering figure, preferably triangular, with the apex pointing toward the edge of the card. The indicators in the series are spaced correspondingly to the divisions in the time scale and to the apertures $c$ in the row, the apex of each indicator being centrally positioned with respect to the numeral representing the corresponding time division of scale B and the aperture in row $c$. The row of indicators serve as an aid to the workman in accurately marking the card by a pencil, or the like, to denote the period or periods of time devoted to one or more jobs of work.

The card A is provided with suitable spaces to receive the date, the name and number of the workman, the department of the factory, and with columns $d$, $e$, $f$, $g$, to receive data concerning the job numbers, operations, time and cost of particular jobs.

In addition to the foregoing, the card A is provided at one corner with a permanent index in the form of a notch D, whereby the card is adapted to be used in the recording machine in the manner to be described hereinafter in connection with the card of Figs. 3 and 4.

As illustrating the method of using the card, it will be assumed that a workman is given a card and assigned to work on two or more jobs. Upon beginning work at 7 a. m., the card is filled in with data at the top, the job number is noted in column $d$ and the character of the work, as "drilling", in column $e$, see Fig. 2, the card being marked at $x$. When the work on the first job is completed, the workman glances at a clock, and finds that it was finished at 9 a. m. The workman marks the card accordingly, by drawing a line $x'$ across columns $a$ $b$ to intersect 9 in column $a$ and the apex of the corresponding indicator C in column $b$; should the next job be completed at 10:10 a. m. the card is correspondingly marked at $x^2$, and so on throughout the day. Should it occur that the workman is not supplied with work for a few minutes, an hour, or more, the card is marked either to denote the idle time or non-productive work. E. g., if the workman is idle from 10:10 to 10:30, the card would be marked at 10:30, as shown at $x^3$, and the idle period noted under the heading "Operation". The card is turned in by the workman and delivered to the auditor's office, whereupon the costs and wages are calculated as follows:— Knowing the rate of wages to be paid to the workman, the card is used in connection with a wage scale on a chart, or the like, the figures in which are the result of calculations for the division of time multiplied by the rate per hour. To ascertain the cost or wages of the first job on the card, a pencil point or stylus is thrust through the aperture $c$ opposite the mark $x$, and the card is slid over the rate scale until the pencil comes to a stop against an abutment, whereupon the apex of the indicator in column $b$ which corresponds to the aperture $c$ and the line $x'$ will point to the figure representing the calculation, thus ascertaining mechanically the desired cost or wages which with the time should be entered on the card in the proper columns $f$ $g$. The calculations for the succeeding jobs can be made accurately and rapidly in the manner described.

The card shown in Figs. 3 and 4 is adapted more particularly for use in a recorder of the character disclosed in my aforesaid application and for carrying out the method, according to one phase thereof, made the subject matter of said Patent 1,065,501. Said card A' is adapted for use on each job, and is provided with means for identifying the workman, operation, etc., all as shown.

The card is provided, also, with column $a'$ for receiving the figures required to produce the elapsed time scale B', and with column $b$ to receive the indicators C which facilitate the calculations by the aid of the chart. The row of apertures $c$ in card A may or may not be used in the machine card A', but this card is provided with a permanent index, preferably the notch D' in one corner thereof in order that the card may be inserted in a predetermined manner only into the recorder. As shown the card is provided with a wage scale E in a column *e*. This scale may or may not be used on the card, but when used, it facilitates the calculation of the cost and wages as explained in the patent. In view of the fact that workmen are paid at different rates per hour, it becomes necessary to use a number of different cards, the figures in the wage columns of which are based upon the rate paid the particular workmen; but by omitting the wage columns from the cards, a factory is enabled to use one style of card for all its employees, thus standardizing the cards.

When using the card A' without the wage scale or apertures *c*, but provided with the elapsed time scale and the series of indicators C, the workman inserts the card into the recorder at the time he begins the work on a particular job in such manner that the notch in the corner receives a card engaging part of one card positioning member, the card fitting between two of such members, and then operates the punch so as to produce a recess 10 in the margin of the card, which recess is cut through one of the indicators which corresponds to the figure in scale B' representing the time of beginning the work. In thus inserting the card, it is incumbent upon the workman to so position it that the permanent index notch D' will be in register with a particular form of card positioning member forming one element of the recorder, two of such card positioning members being employed in such recorder and said members being spaced just sufficiently for the notched card to be received between them. As disclosed in the application and the patent aforesaid, the card positioning members are moved by a time train relative to a punching mechanism, or vice versa, and when the card is inserted and punched at the first operation in the manner just described, the recess 10 produced in said card serves as a guide for the purpose of determining the position of the card for a second and subsequent punching operation, the said recess 10 being shown as of tapering form. Now, having punched the card by the machine for the first time, the operator removes the card from the machine, carries it to his place of work, and proceeds to perform the work, a measurable interval of time intervening between the first operation of punching the card and that of completing the assigned work. Upon completing the work, the card is carried back to the machine, and inserted therein a second time for the aforesaid second and subsequent punching operation; but it is to be noted, first, that the card positioning member will have been moved by the time train to a different position relative to the card punching mechanism from that which it occupied at the first punching operation and, second, the card is preferably reversed, *i. e.* turned end for end and inverted or turned over so that the recess first produced in the card will receive a correspondingly shaped part of the card positioning member. It should be noted that the punch is beveled and the card engaging part provided on the card positioning member is also beveled, the bevel on one part being reversed to that on the other part, whereby the parts are relatively positioned so that the workman cannot insert the card properly at the second time unless said card is reversed. Now, when the card is so inserted, the punch mechanism is operated and a second recess 11 is punched in the card; but this second recess 11 is reversed to the first recess 10 for the reason that the card is reversed in position for the second operation.

The recesses 10, 11 are produced in the edge of the card having indicators C, the material being cut out up to the column *a'*.

A card provided with the elapsed time scale and with the rate scale, and punched as described, produces a record of the time and wages on its face, such form of card being particularly useful for individual jobs. A card provided with the time scale only may be used in the recorder without reversing the card between the first punch and any subsequent punch, this form of card being useful for a number of jobs. The card thus punched is turned in to the auditor's office, and from the data afforded, the calculations are effected in the manner heretofore described, *i. e.* by the aid of the wage scale or scales based upon the time at a fixed rate per hour, the tapering recesses affording means for accurately positioning the card in respect of the wage scales when sliding the cards over said scales.

Having thus fully described the invention, what I claim as new, and desire to secure by Letters Patent, is:—

1. A record card for effecting calculations provided with a time scale, representing hours and fractions thereof, positioned along one edge of said card whereby the major part of said card is left free for the application of data for properly identifying the work to which the card relates, and said card being also provided with means associated with the time scale whereby said time scale is adapted to be used as a basis for effecting the calculation of the value of costs or wages.

2. A record card for effecting calculations provided with a time scale positioned near one edge of the card, said scale representing hours and fractions thereof, and with a series of indicators, said indicators being spaced correspondingly to the divisions of the time scale and positioned intermediate the time scale and the adjacent edge of the card.

3. A record card for effecting calculations, provided with a time scale representing hours and fractions thereof, and with a series of tapering indicators positioned near and pointing toward a margin of the card, said indicators being spaced correspondingly to the divisions of the time scale.

4. A record card for effecting calculations, provided with a time scale representing hours and fractions thereof, and with a series of perforations positioned adjacent to said elapsed time scale and spaced correspondingly to the divisions thereof.

5. A record card for effecting calculations, provided with a time scale representing hours and fractions thereof, a series of indicators near a margin of the card, and a series of perforations, said indicators and perforations being spaced correspondingly to the divisions of the time scale.

In testimony whereof I have signed my name to this specification in the presence of two subscribing witnesses.

CLARENCE A. BISHOP.

Witnesses:
H. I. BERNHARD,
M. C. RODRIGUEZ.

Copies of this patent may be obtained for five cents each, by addressing the "Commissioner of Patents, Washington, D. C."